United States Patent
Lee et al.

(10) Patent No.: US 10,289,241 B2
(45) Date of Patent: May 14, 2019

(54) SENSING APPARATUS FOR TOUCH AND FORCE SENSING

(71) Applicant: SUPERC-TOUCH CORPORATION, New Taipei (TW)

(72) Inventors: Hsiang-Yu Lee, New Taipei (TW); Shang Chin, New Taipei (TW); Ping-Tsun Lin, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 36 days.

(21) Appl. No.: 15/611,778

(22) Filed: Jun. 1, 2017

(65) Prior Publication Data

US 2017/0364199 A1    Dec. 21, 2017

(30) Foreign Application Priority Data

Jun. 17, 2016    (TW) .............................. 105119135 A

(51) Int. Cl.
*G06F 3/041*    (2006.01)
*G06F 3/044*    (2006.01)

(52) U.S. Cl.
CPC ............ *G06F 3/0416* (2013.01); *G06F 3/044* (2013.01); *G06F 2203/04105* (2013.01); *G06F 2203/04112* (2013.01)

(58) Field of Classification Search
CPC .................. G06F 3/044; G06F 3/0414; G06F 2203/04103; G06F 2203/04105
See application file for complete search history.

(56) References Cited

U.S. PATENT DOCUMENTS

| 2011/0057899 A1* | 3/2011 | Sleeman ................. G01L 1/146 345/174 |
| 2014/0204285 A1 | 7/2014 | Jang |
| 2015/0116608 A1* | 4/2015 | Jeong .................... G06F 1/1652 349/12 |
| 2017/0045992 A1* | 2/2017 | Lee ........................ G06F 3/0416 |

(Continued)

FOREIGN PATENT DOCUMENTS

| TW | 201032116 A | 9/2010 |
| TW | 201113779 A | 4/2011 |

(Continued)

OTHER PUBLICATIONS

Office Action dated Jul. 7, 2017 of the corresponding Taiwan patent application.

*Primary Examiner* — Yuzhen Shen
(74) *Attorney, Agent, or Firm* — Chun-Ming Shih; HDLS IPR Services

(57) ABSTRACT

A sensing apparatus for touch and force sensing includes from, top to bottom, a protection layer, a touch electrode layer, a force electrode layer, and a resilient dielectric layer, and further includes a capacitance sensing module. In touch sensing operation, the capacitance sensing module sequentially or randomly applies a touch driving signal to selected ones of the second touch electrodes, and sequentially or randomly receives a touch sensing signal from selected ones of the first touch electrodes. In force sensing operation, the capacitance sensing module sequentially or randomly applies a force capacitance-exciting signal to the at least one force sensing electrode and obtains a force sensing signal from the force sensing electrode.

23 Claims, 16 Drawing Sheets

(56) References Cited

U.S. PATENT DOCUMENTS

| | | | |
|---|---|---|---|
| 2017/0115812 A1* | 4/2017 | Lin | G06F 3/0416 |
| 2017/0192582 A1* | 7/2017 | Pan | G06F 3/0416 |
| 2017/0235414 A1* | 8/2017 | Ding | G06F 3/047 |
| | | | 345/174 |
| 2017/0269773 A1* | 9/2017 | Suzuki | G06F 3/0416 |

FOREIGN PATENT DOCUMENTS

| | | |
|---|---|---|
| TW | 201426473 A | 7/2014 |
| TW | M520681 U | 4/2016 |
| TW | M541607 U | 5/2017 |

* cited by examiner

SENSING APPARATUS FOR TOUCH AND FORCE SENSING

BACKGROUND OF THE INVENTION

Field of the Invention

The present invention relates to a sensing apparatus, especially to a sensing apparatus for touch and force sensing.

Description of Prior Art

The touch display panels become popular as the market growing of the compact and lightweight mobile device. The pressure touch control technology has rapid development owing to the maturity of touch-control user interface and serious demand for 3D touch operation. The conventional pressure touch control panel generally integrates microelectromechanical sensor at edge or corner of the display panel to sense tactile pressure on the display panel, the cost of the sensor is high and the assembling of the sensor is difficult. A resilient micro structure is also provided by manufacturing with complex process, to enhance a relation between force and deformation level, for generating more physical variation to be sensed, thus it still needs lots of effort to improve the force and touch sensing panel.

SUMMARY OF THE INVENTION

Accordingly, the present invention is objected to provide a touch and force sensing apparatus.

The present invention is thus purposed to provide a touch and force sensing apparatus, including a touch electrode layer, including a plurality of first touch electrodes arranged along a first direction and a plurality of second touch electrodes arranged along second direction, wherein the first direction is perpendicular to the second direction; a protection layer arranged on a side of the touch electrode layer; a force electrode layer arranged on a side of the touch electrode layer, the side being opposite to the protection layer, the force electrode layer comprising at least one force sensing electrode; a resilient dielectric layer, arranged on a side of the force electrode layer, the side being opposite to the touch electrode layer; and a capacitance sensing module sequentially or randomly applying a touch driving signal to selected ones of the second touch electrodes, and sequentially or randomly receiving a touch sensing signal from selected ones of the first touch electrodes in a touch sensing operation; the capacitance sensing module sequentially or randomly applying a force capacitance-exciting signal to the at least one force sensing electrode, and receiving a force sensing signal from the force sensing electrode in a force sensing operation.

Accordingly, the present invention provides a touch and force sensing apparatus, comprising a touch electrode layer, comprising a plurality of touch electrodes; a protection layer arranged on a side of the touch electrode layer; a force electrode layer arranged on a side of the touch electrode layer, the side being opposite to the protection layer, the force electrode layer comprising at least one force sensing electrode; a resilient dielectric layer, arranged on a side of the force electrode layer, the side being opposite to the touch electrode layer; and a capacitance sensing module sequentially or randomly applying a touch capacitance-exciting signal to the at least one touch electrode, and sequentially or randomly receiving a touch sensing signal from the touch electrode for touch sensing; the capacitance sensing module applying a force capacitance-exciting signal to the at least one force sensing electrode, and receiving a force sensing signal from the force sensing electrode for force sensing.

The touch and force sensing apparatus of the present invention integrates touch sensing and force sensing to an apparatus with simple structure, to decrease cost and increase convenience for use.

BRIEF DESCRIPTION OF DRAWING

One or more embodiments of the present disclosure are illustrated by way of example and not limitation in the figures of the accompanying drawings, in which like references indicate similar elements. These drawings are not necessarily drawn to scale.

DETAILED DESCRIPTION OF THE INVENTION

Figure 7A:
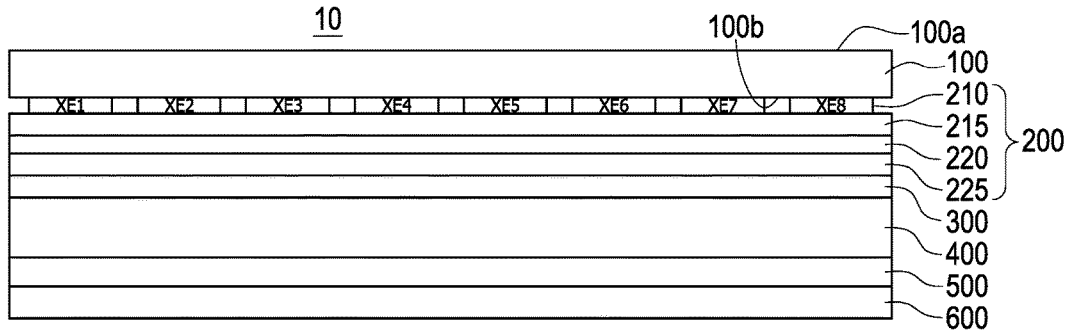
FIG. 7A is a stack diagram of a touch and force sensing apparatus according to an embodiment of the present invention.

Please refer to FIG. 7A, FIG. 7A is a stack diagram of a touch and force sensing apparatus 10 according to an embodiment of the present invention. The touch and force sensing apparatus 10 includes, from top to bottom, a protection layer 100, a touch electrode layer 200, a force electrode layer 300, a resilient dielectric layer 400, a substrate 500 and a reference force electrode layer 600. The protection layer 100 includes a first surface 100a and a second surface 100b, and the touch electrode layer 200 is on the second surface 100b. The touch electrode layer 200 includes, from top to bottom, a plurality of first touch electrodes 210 (for example, first touch electrodes XE1-XE8 shown in the diagram) arranged along a first direction, an electrode isolation layer 215, a plurality of second touch electrodes 220 arranged along a second direction and an isolation layer 225, but it is only a side of stack diagram here, a number of the first touch electrodes 210 and arrangement thereof are not limited to this, and the first direction is substantially perpendicular to the second direction. The first touch electrodes 210 are arranged on a second surface 100b of the protection layer 100, and the second touch electrodes 220 are arranged on a side of the electrode isolation layer 215, the side is opposite to the protection layer 100. That is, the second touch electrodes 220 are arranged farther away from the protection layer 100 in comparison with the electrode isolation layer 215. The electrode isolation layer 215 is arranged between the first touch electrodes 210 and the second touch electrodes 220. The force electrode layer 300 is arranged on a side of the isolation layer 225, the side is opposite to the protection layer 100. That is, the force electrode layer 300 is arranged farther away from the protection layer 100 in comparison with the isolation layer 225. The isolation layer 225 is arranged between the force electrode layer 300 and the second touch electrodes 220, while the resilient dielectric layer 400 is arranged between the substrate 500 and the force electrode layer 300. The reference force electrode layer 600 is arranged on a side of the substrate 500, the side is opposite to the resilient dielectric layer 400, and the reference force electrode layer 600 includes at least one reference force electrode.

Figure 7B:
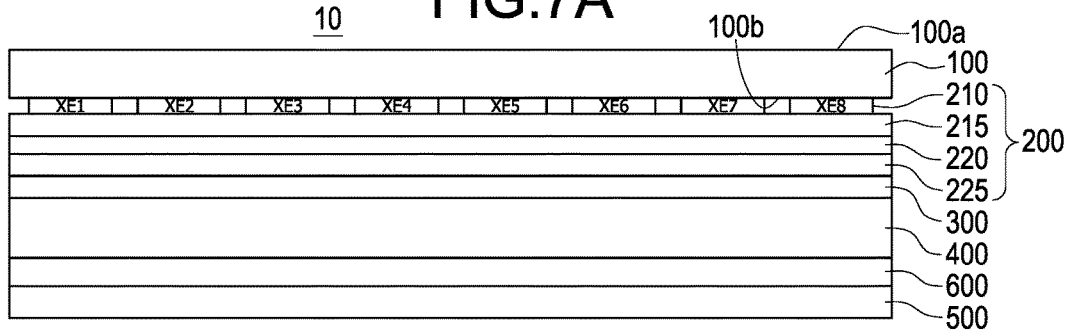
FIG. 7B is a stack diagram of a touch and force sensing apparatus according to another embodiment of the present invention.

Please refer to FIG. 7B, FIG. 7B is a stack diagram of a touch and force sensing apparatus 10 according to another embodiment of the present invention. The touch and force sensing apparatus 10 in FIG. 7B is similar to that shown in FIG. 7A. However, a position of the substrate 500 is exchanged with that of the reference force electrode layer 600. That is, the reference force electrode layer 600 is arranged between the substrate 500 and the resilient dielectric layer 400.

Figure 4:
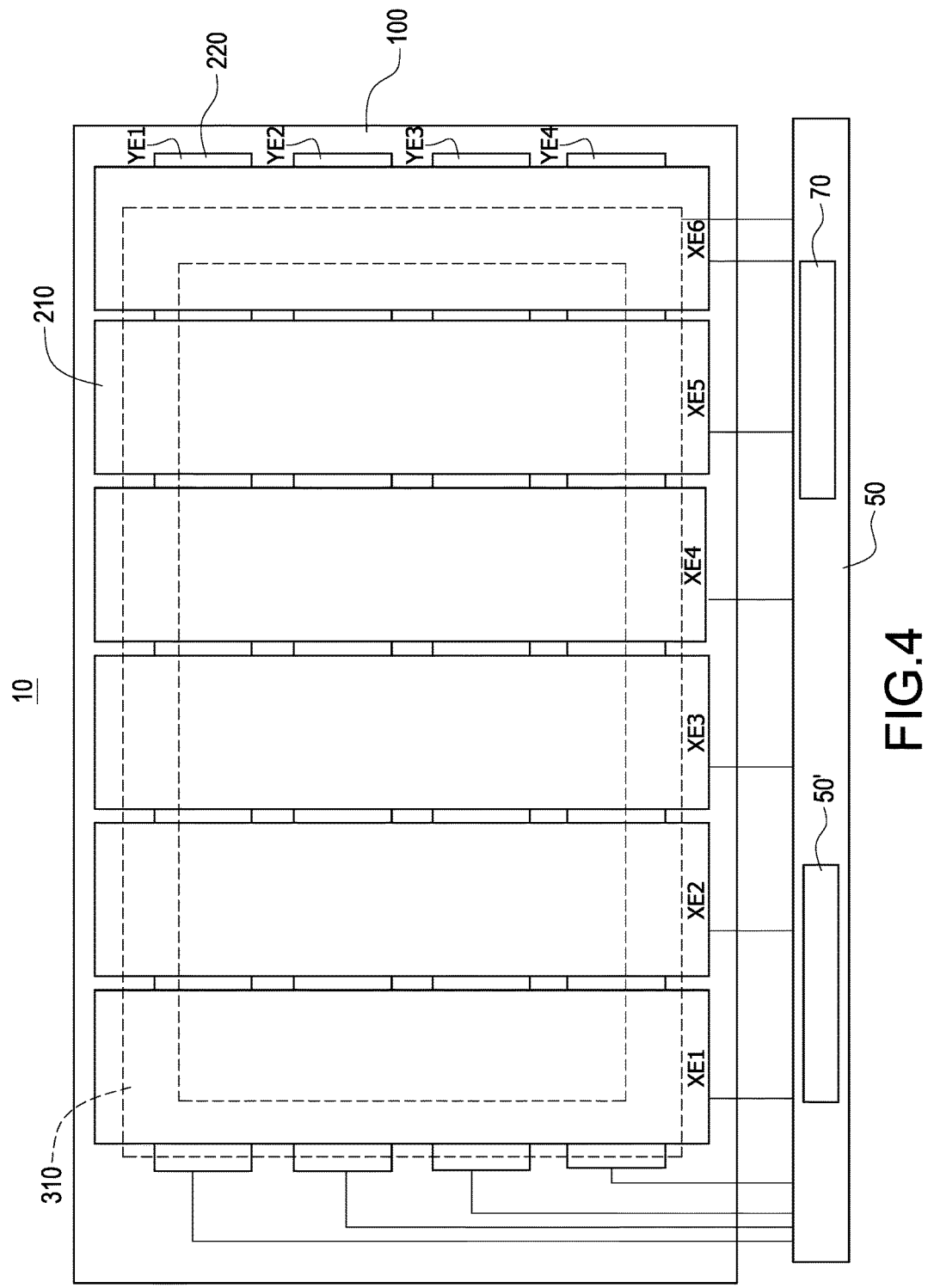
FIG. 4 is a top view of a touch and force sensing apparatus according to another embodiment of the present invention.

Refer to FIG. 4, FIG. 4 is a top view of the touch and force sensing apparatus 10 shown in FIGS. 7A, 7B, mainly illustrating arrangement of the protection layer 100, the first touch electrodes 210, the second touch electrodes 220, and the force electrode layer 300 in the top view. However, it needs to be known that sizes of elements shown in the diagram are not limited, the elements are purposely separated from each other for more clear illustration of the arrangement on a plane. In addition, the touch and force sensing apparatus 10 also includes a capacitance sensing module 50, the capacitance sensing module 50 includes a mutual-capacitance sensing circuit 70 and a self-capacitance sensing circuit 50'. In touch operation, a position of a touch point is sensed by the mutual-capacitance sensing circuit 70. In force sensing operation, the self-capacitance sensing circuit 50' senses self-capacitance change of force sensing electrodes. The force electrode layer 300 further includes at least one force sensing electrode 310 (such as a force sensing electrode 310 shown here). In the embodiment, the first touch electrodes 210 (XE1-XE6) are arranged along the first direction, and the number and arrangement of the first touch electrode 210 are not limited here. Moreover, the second touch electrodes 220 (YE1-YE4) are arranged along the second direction, and the number and arrangement of second touch electrode 220 are not limited here. The first direction is substantially perpendicular to the second direction.

Figure 7C:
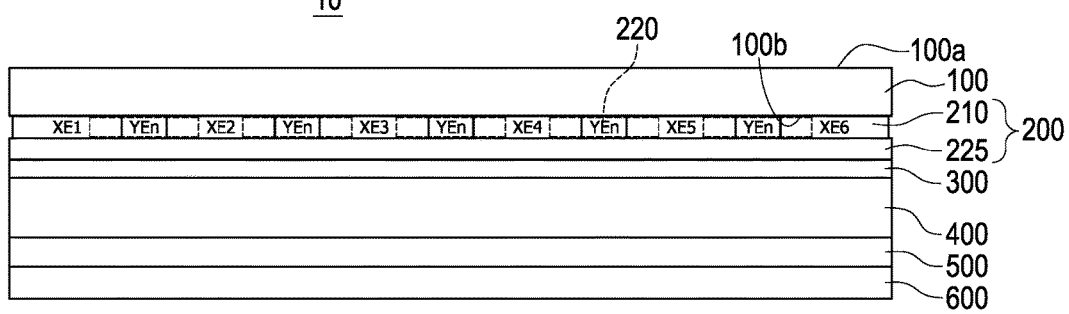
FIG. 7C is a stack diagram of a touch and force sensing apparatus according to another embodiment of the present invention.
Figure 7D:
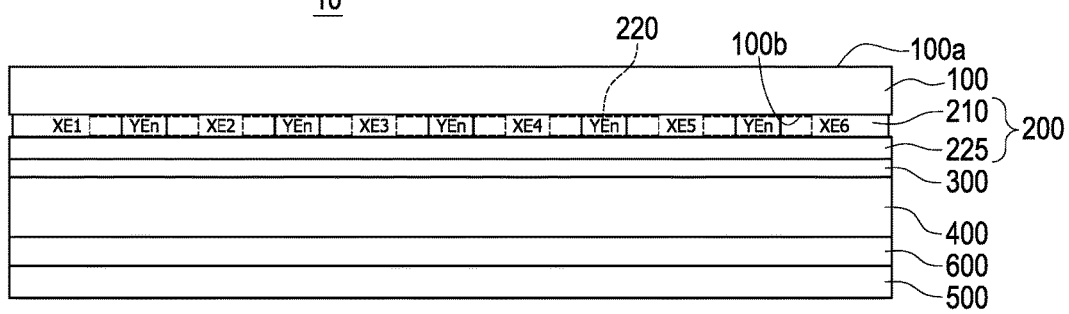
FIG. 7D is a stack diagram of a touch and force sensing apparatus according to another embodiment of the present invention.

Please refer to FIG. 7C, FIG. 7C is a stack diagram of a touch and force sensing apparatus 10 according to another embodiment of the present invention. The touch and force sensing apparatus 10 in FIG. 7C is similar to that shown in FIG. 7A. However, in the touch electrode layer 200, the first touch electrodes 210 and the second touch electrodes 220 are arranged on the same surface. FIG. 7D is a stack diagram of a touch and force sensing apparatus 10 according to another embodiment of the present invention. The touch and force sensing apparatus 10 in FIG. 7D is similar to that shown in FIG. 7C. However, the position of the substrate 500 is exchanged with that of the reference force electrode layer 600. That is, the reference force electrode layer 600 is arranged between the substrate 500 and the resilient dielectric layer 400.

Figure 1:
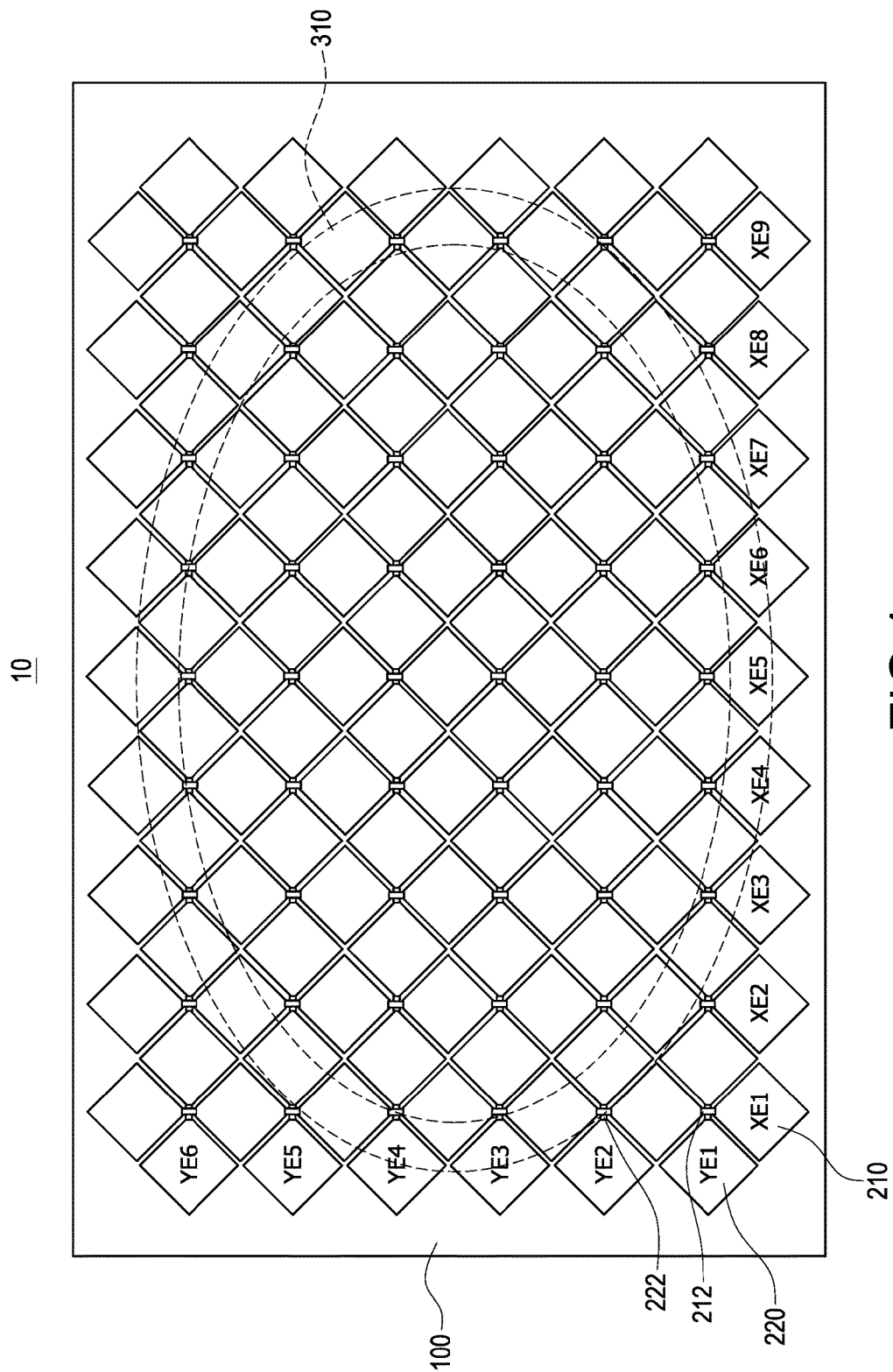
FIG. 1 is a top view of a touch and force sensing apparatus according to an embodiment of the present invention.

Refer also to FIG. 1, FIG. 1 is a top view of a touch and force sensing apparatus 10 according to an embodiment of the present invention, and corresponding to embodiments shown in FIG. 7C and FIG. 7D. FIG. 1 mainly illustrates arrangement of the protection layer 100, the first touch electrodes 210, the second touch electrodes 220, and the force electrode layer 300 in top view. However, it needs to be known that sizes of elements shown in the diagram are not limited, the elements are purposely separated from each other for more clear illustration of the arrangement on a plane. In addition, the touch and force sensing apparatus 10 also includes a capacitance sensing module, the capacitance sensing module may be, for example, referred to the capacitance sensing module 50 shown in FIG. 4. That is, the touch and force sensing apparatus 10 in FIG. 1 includes a mutual-capacitance sensing circuit 70 and a self-capacitance sensing circuit 50' as those shown in FIG. 4. Refer to FIG. 1 again, the force electrode layer 300 further includes at least one force sensing electrode 310 (a force sensing electrode 310 shown in the diagram). The force sensing electrode is oval shape shown in dotted line, sizes of the force sensing electrode are not limited here. In the touch and force sensing apparatus 10 shown in FIG. 1, the first touch electrodes 210

(such as the first touch electrodes XE1-XE9 shown in the diagram) are arranged along the first direction. Moreover, each two adjacent first touch electrodes 210 in the same column are connected by a conductive bridge 212. The second touch electrode 220 (such as the second touch electrode YE1-YE6 shown in the diagram) is arranged along second direction. Moreover, each two adjacent second touch electrodes 220 in the same row are connected by a conductive bridge 222. Moreover, the conductive bridge 212 and conductive bridge 222 are separated by an isolation layer (not shown) to avoid short circuit, the conductive bridges are metal or indium tin oxide (ITO).

Figure 2:
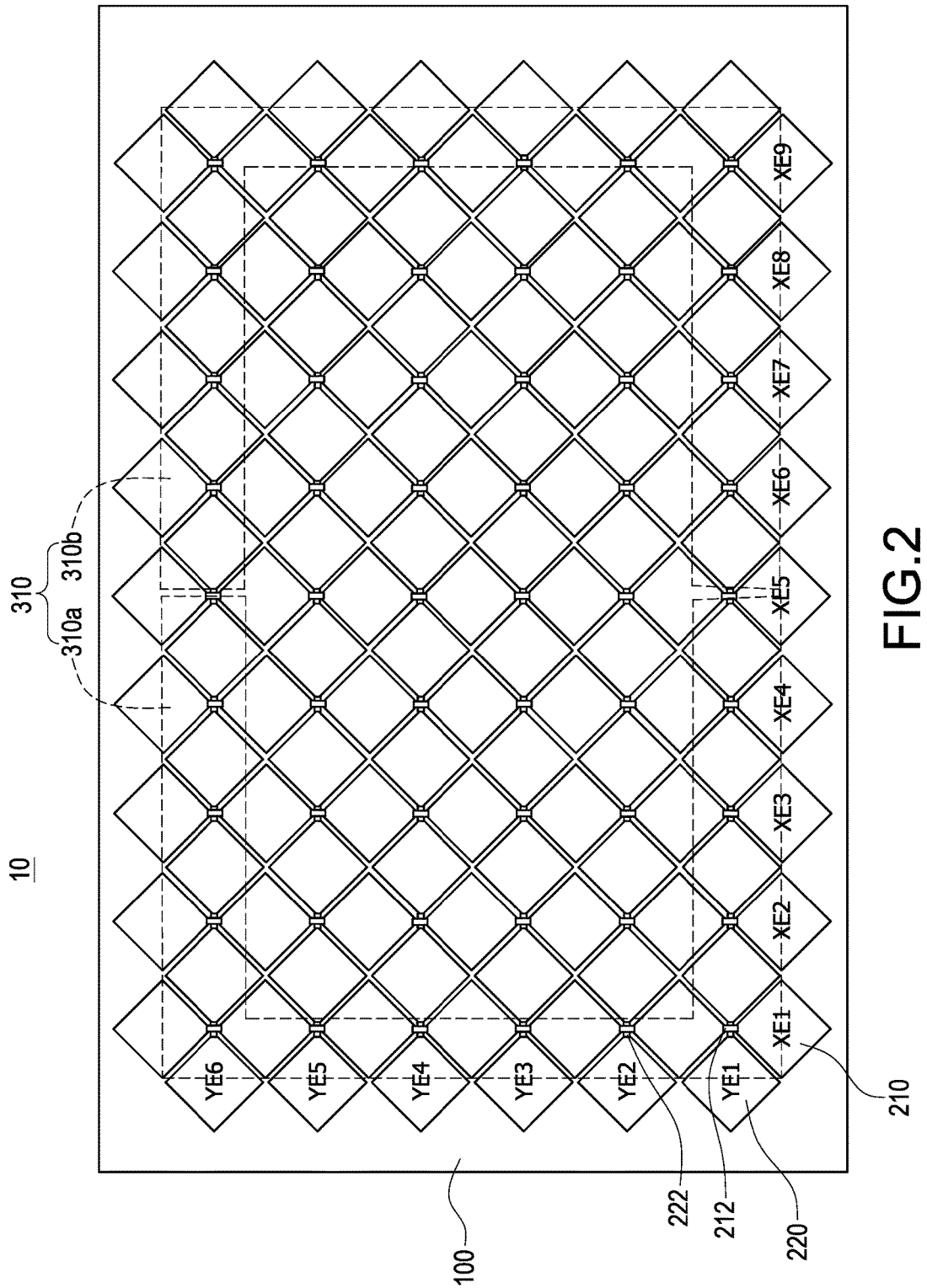
FIG. 2 is a top view of a touch and force sensing apparatus according to another embodiment of the present invention.

Refer also to FIG. 2, FIG. 2 is a top view of a touch and force sensing apparatus 10 according to another embodiment of the present invention, the touch and force sensing apparatus 10 in FIG. 2 is similar to that shown in FIG. 1. However, in the embodiment, the force electrode layer 300 includes two force sensing electrodes 310 (such as the force sensing electrodes 310a, 310b shown in the diagram). That is, the force sensing electrodes are shown as two dotted U shapes, and it needs to be known that sizes of the force sensing electrodes are not limited.

Figure 3:
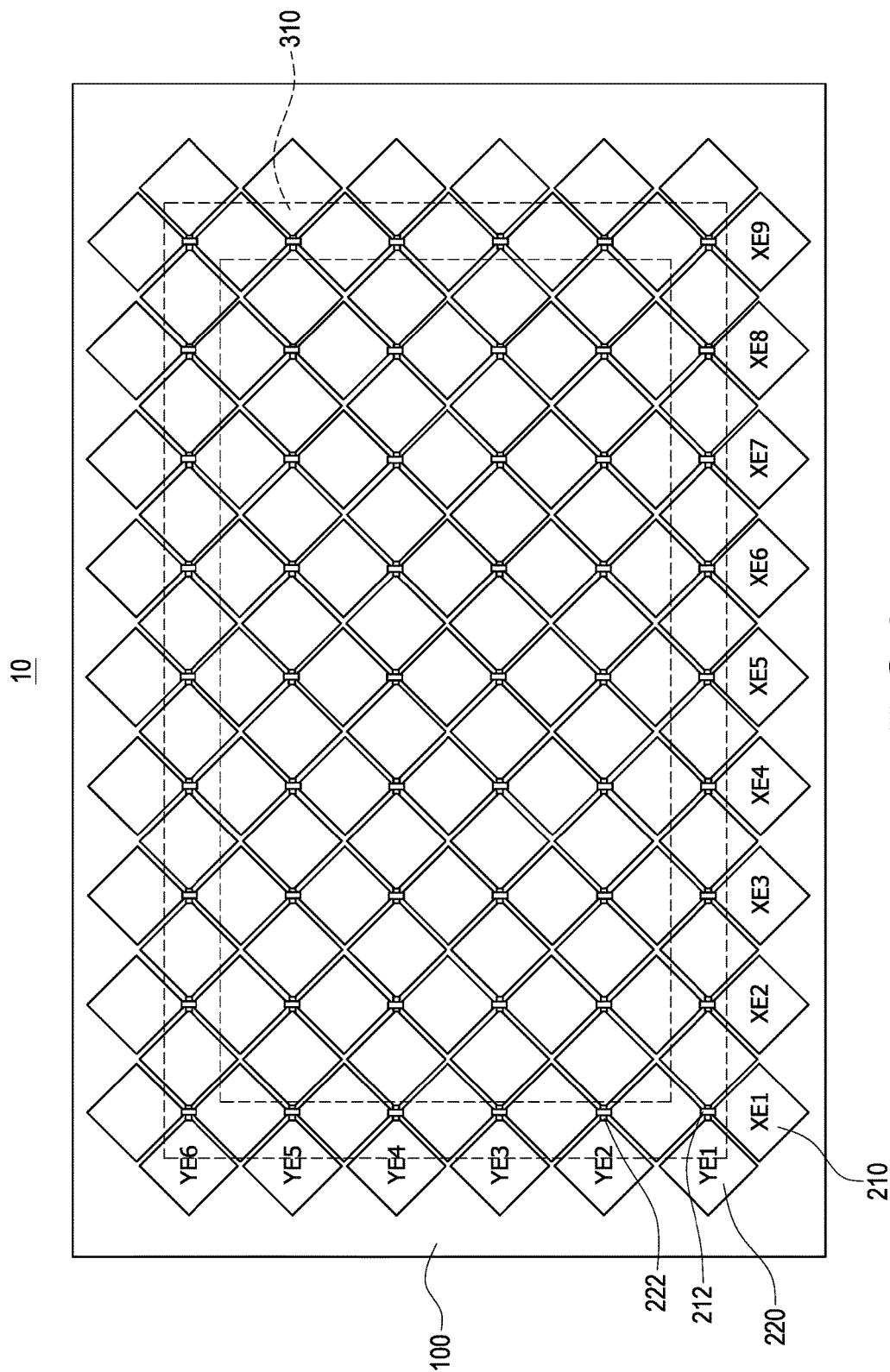
FIG. 3 is a top view of a touch and force sensing apparatus according to another embodiment of the present invention.

Refer also to FIG. 3, FIG. 3 is a top view of a touch and force sensing apparatus 10 according to another embodiment of the present invention, the touch and force sensing apparatus 10 in FIG. 3 is similar to that shown in FIG. 2. However, in the embodiment, the force electrode layer 300 includes one force sensing electrode 310 (such as the force sensing electrode 310 shown in the diagram). That is, the force sensing electrode is shown as roughly dotted rectangle, and it needs to be known that sizes of the force sensing electrode are not limited.

Figure 5:
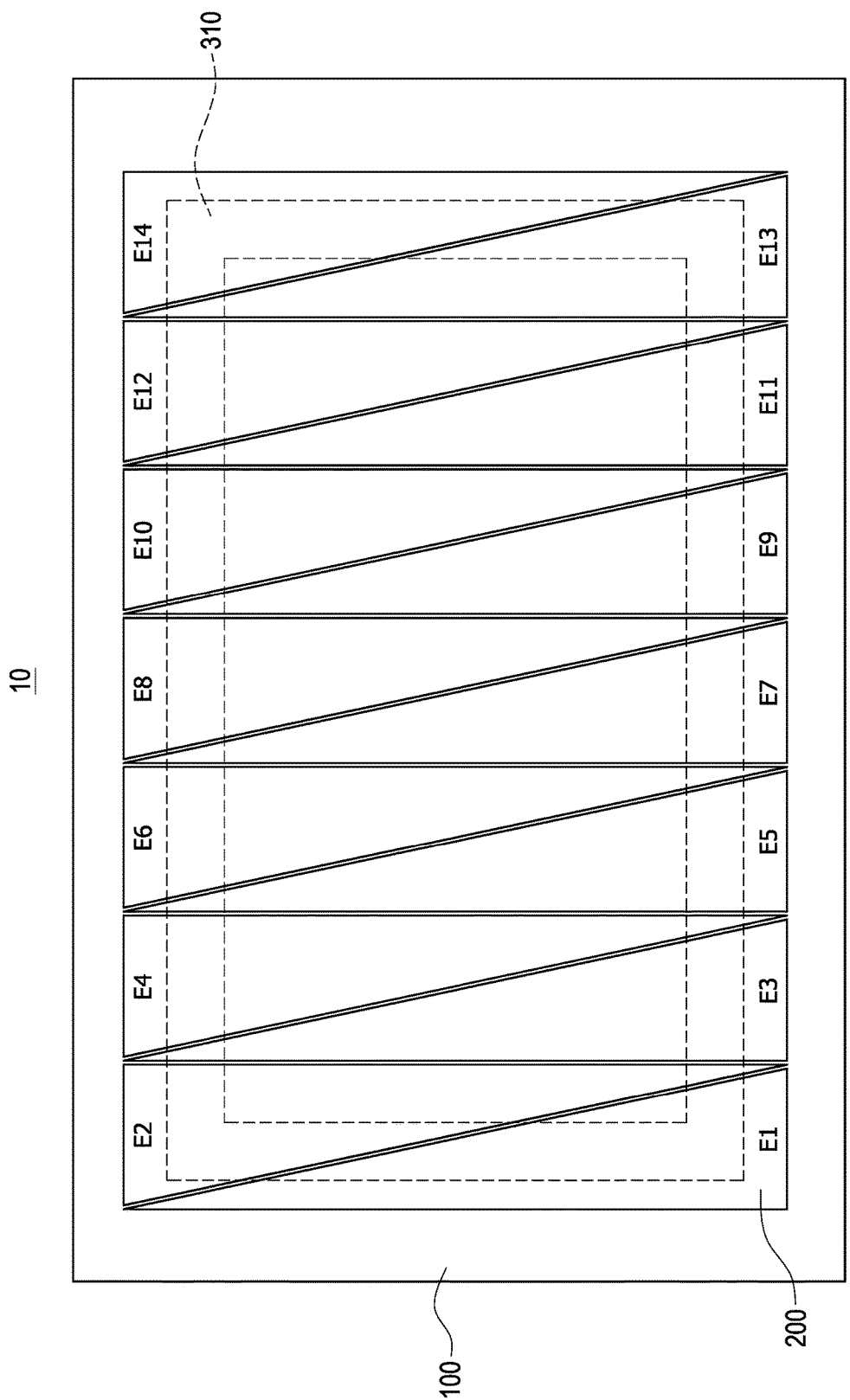
FIG. 5 is a top view of a touch and force sensing apparatus according to another embodiment of the present invention.

Refer also to FIG. 5, FIG. 5 is a top view of a touch and force sensing apparatus 10 according to another embodiment of the present invention, the touch and force sensing apparatus 10 here performs touch sensing with self-capacitance, thus FIG. 5 is similar to FIGS. 7C and 7D, but touch sensing electrodes E1-E14 replace the first touch electrode 210 and second touch electrode 220. FIG. 5 mainly illustrates arrangement of the protection layer 100, the touch sensing electrodes E1-E14, the force sensing electrode 310 in top view, the touch sensing electrodes (E1-E14) form a polygon staggered with each other, the polygon may be a polygon with hypotenuse, for example, triangle or trapezoid. In the embodiment, the touch sensing electrode E1 is staggered with the adjacent touch sensing electrode E2 to form two triangles staggered with each other. The force electrode layer 300 further includes at least one force sensing electrode 310 (such as one force sensing electrode 310 shown in the diagram). The force sensing electrode is shown as roughly dotted rectangle, it needs to be known that size of the force sensing electrode is not limited.

Figure 6:
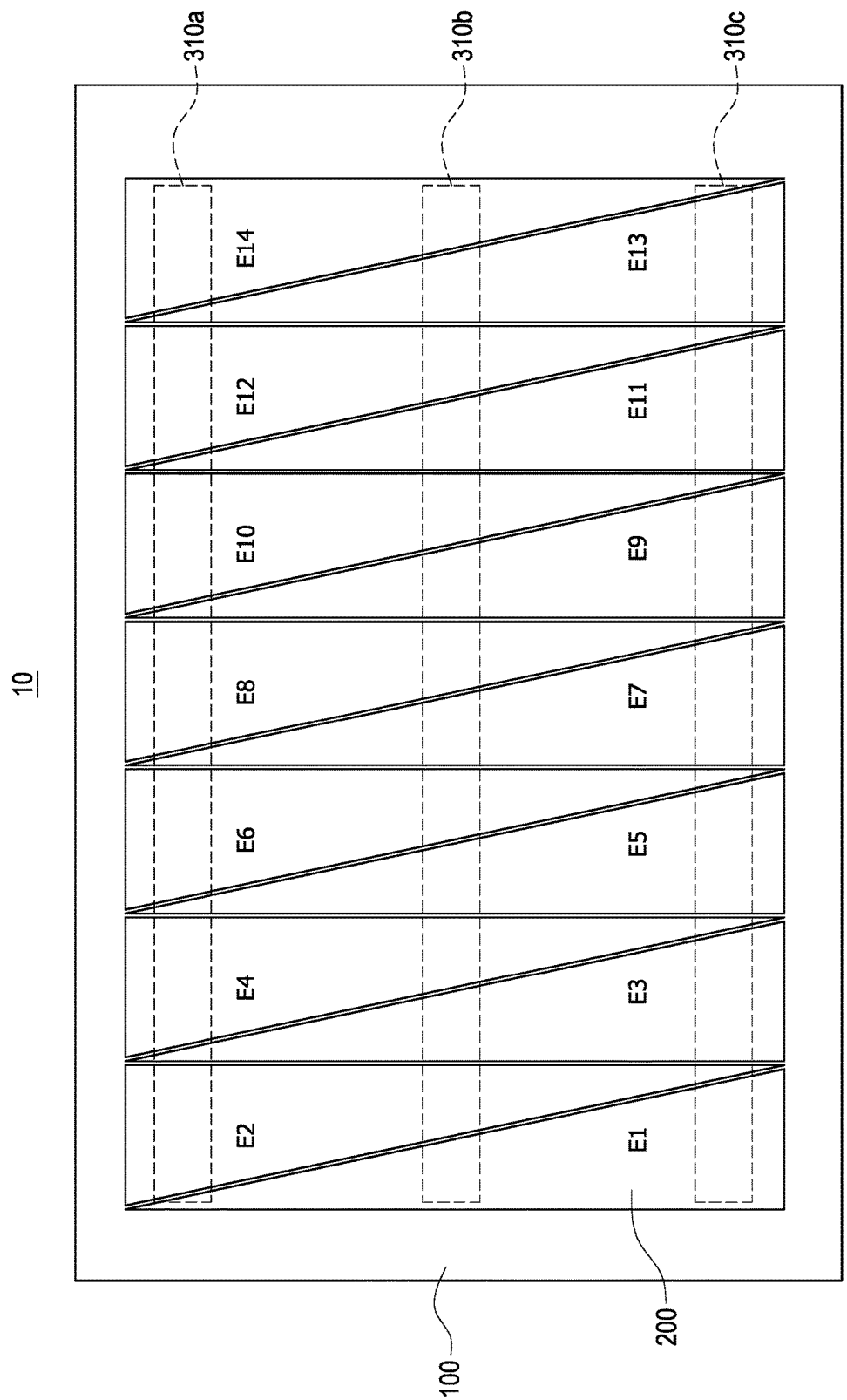
FIG. 6 is a top view of a touch and force sensing apparatus according to another embodiment of the present invention.

Refer also to FIG. 6, FIG. 6 is a top view of a touch and force sensing apparatus 10 according to another embodiment of the present invention, the touch and force sensing apparatus 10 of the embodiment also performs touch sensing with self-capacitance. The touch and force sensing apparatus 10 shown in FIG. 6 is similar to that shown in FIG. 5. FIG. 6 mainly illustrates arrangement of the protection layer 100, the touch sensing electrodes E1-E14, the force sensing electrode 310 in top view. However, in the embodiment, the force electrode layer 300 includes three force sensing electrodes 310 (such as the force sensing electrodes 310a, 310b, and 310c shown in the diagram). That is, the force sensing electrode is shown as dotted elongated rectangle, and it needs to be known that sizes of the force sensing electrodes are not limited.

Figure 8C:
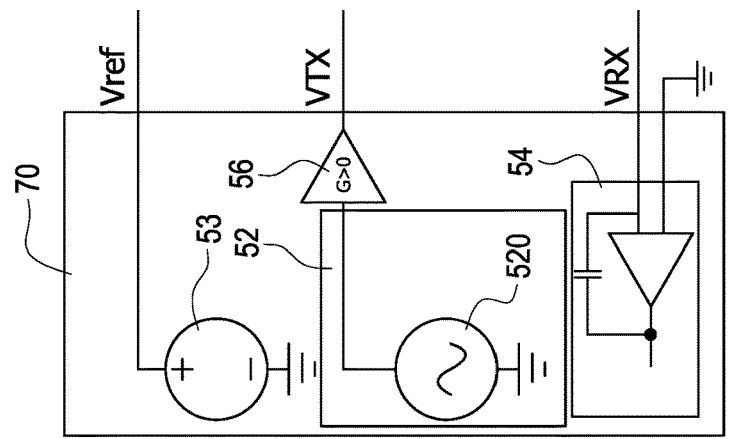
FIG. 8C is a diagram of signal in touch sensing or force sensing of a touch and force sensing apparatus according to another embodiment of the present invention.
Figure 8B:
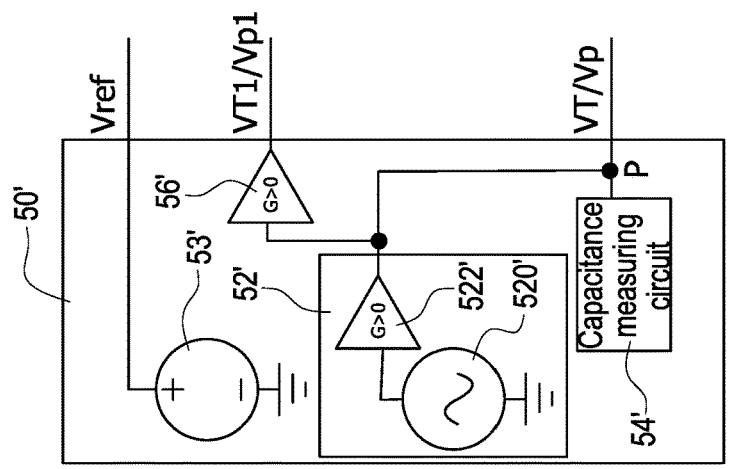
FIG. 8B is a diagram of signal in touch sensing or force sensing of a touch and force sensing apparatus according to another embodiment of the present invention.
Figure 8A:
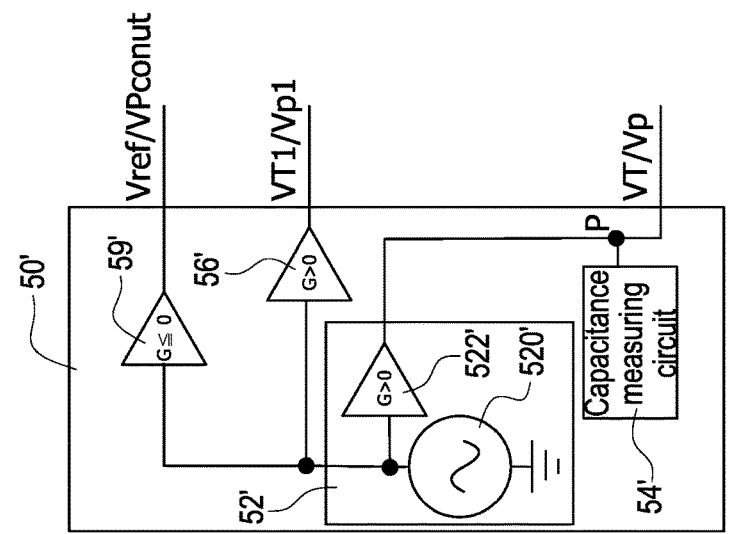
FIG. 8A is a diagram of signal in touch sensing or force sensing of a touch and force sensing apparatus according to an embodiment of the present invention.

FIG. 8A-8C are diagrams of signal in touch sensing or force sensing of a touch and force sensing apparatus according to different embodiments of the present invention. Firstly, refer also to FIG. 8C, and FIG. 9A and FIG. 10, the mutual-capacitance sensing circuit 70 in FIG. 8C includes a transmission signal source 520, a non-inverting amplifier 56, a DC reference voltage source 53 and a capacitance measuring circuit 54. In touch sensing operation, the transmission signal source 520 applies the touch driving signal VTX, via the non-inverting amplifier 56, to at least one second touch electrode 220. The capacitance measuring circuit 54 receives a touch sensing signal VRX from at least one first touch electrode 210. In addition, the DC reference voltage source 53 applies a reference voltage Vref (for example, a grounded signal with a zero voltage) to the force sensing electrode 310, for decreasing or completely eliminating influence to touch sensing, wherein the influence results from warping or deformation of the resilient dielectric layer 400.

Figure 9A:
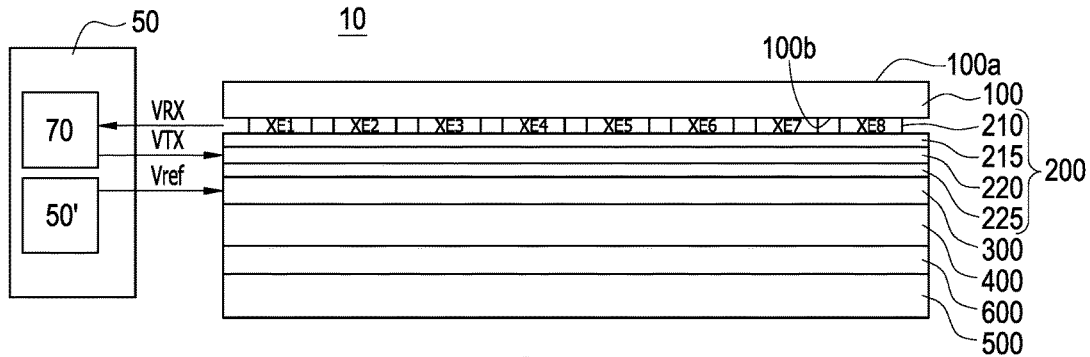
FIG. 9A is a diagram of a touch and force sensing apparatus according to an embodiment of the present invention.
Figure 10:
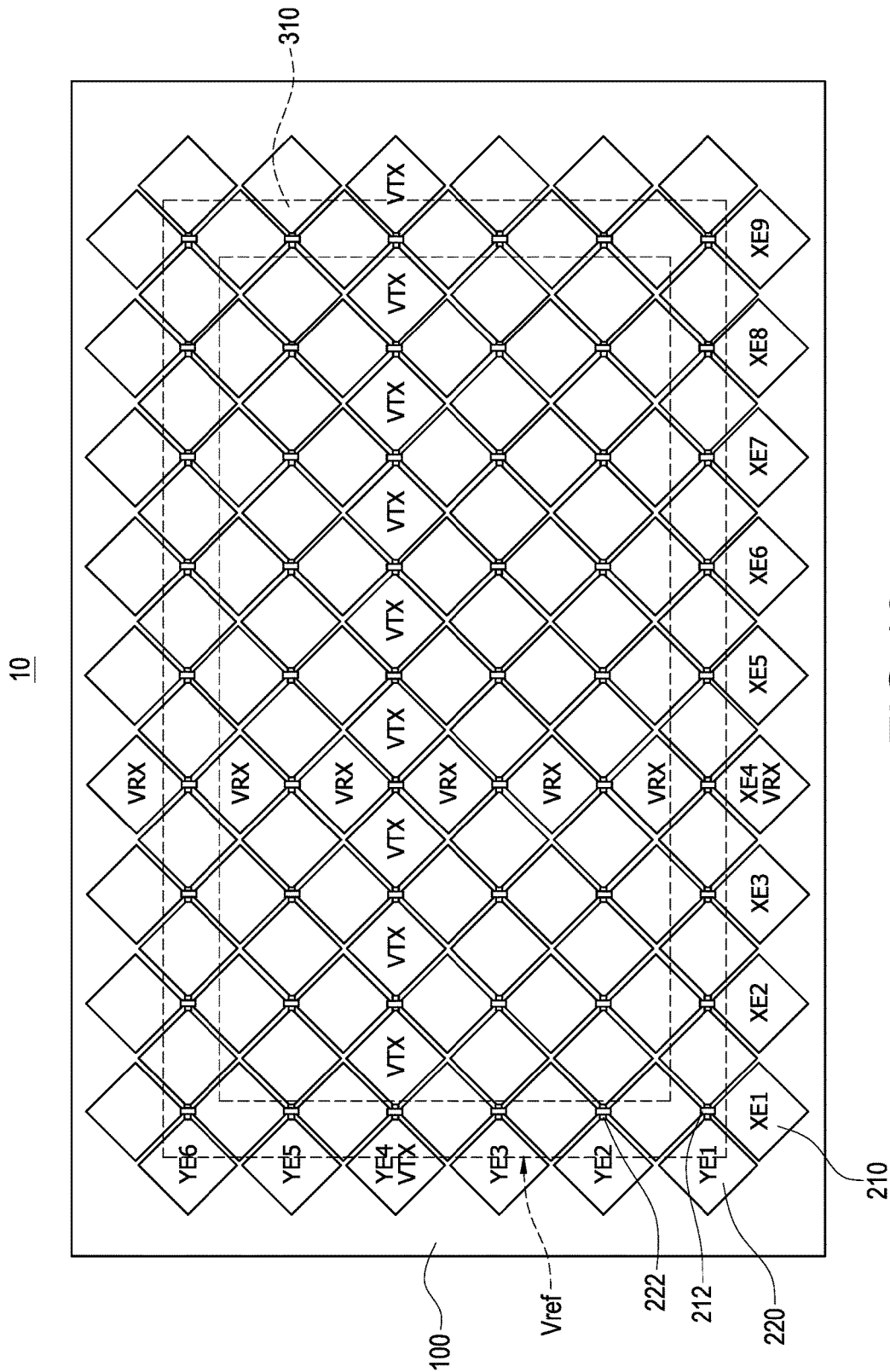
FIG. 10 is a top view of a signal of a touch and force sensing apparatus in touch sensing according to an embodiment of the present invention.

Refer also to FIG. 9A, FIG. 9A is a diagram of a touch and force sensing apparatus 10 according to an embodiment of the present invention. The touch and force sensing apparatus 10 in FIG. 9A is similar to that shown in FIG. 7B. As shown in this figure, the mutual-capacitance sensing circuit 70 is electrically coupled to the first touch electrode 210 and the second touch electrode 220 respectively, while the self-capacitance sensing circuit 50' is electrically coupled to force electrode layer 300. Refer also to FIG. 10, FIG. 10 is a top view of a signal of a touch and force sensing apparatus 10 in touch sensing according to an embodiment of the present invention, the touch and force sensing apparatus 10 in FIG. 10 is similar to that shown in FIG. 3, FIG. 10 mainly illustrates arrangement of the touch driving signal VTX and touch sensing signal VRX of the touch and force sensing apparatus 10 in touch sensing. The first touch electrode 210 is touch sensing electrode for sensing finger touching, while the second touch electrode 220 is touch driving electrode. The mutual-capacitance sensing circuit 70 (as shown in FIG. 9A) sequentially or randomly applies a touch driving signal VTX to the selected ones of the second touch electrodes 220 (such as YE4 shown in FIG. 10), and sequentially or randomly receives the touch sensing signal VRX (such as XE4 shown in FIG. 10) from the selected ones of the first touch electrodes 210. By sensing the touch sensing signal VRX, it can be known if there is touching on an intersecting position of corresponding first touch electrode 210 and second touch electrode 220. Meanwhile, a reference voltage Vref is applied to the at least one force sensing electrode 310, to decrease or completely eliminating influence to touch sensing, wherein the influence results from warping or deformation of the resilient dielectric layer 400.

Figure 9B:
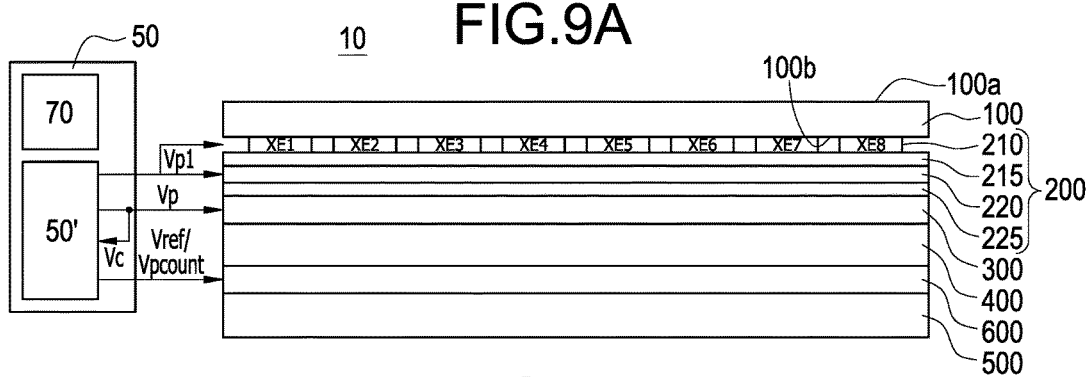
FIG. 9B is a diagram of a touch and force sensing apparatus according to another embodiment of the present invention.
Figure 11:
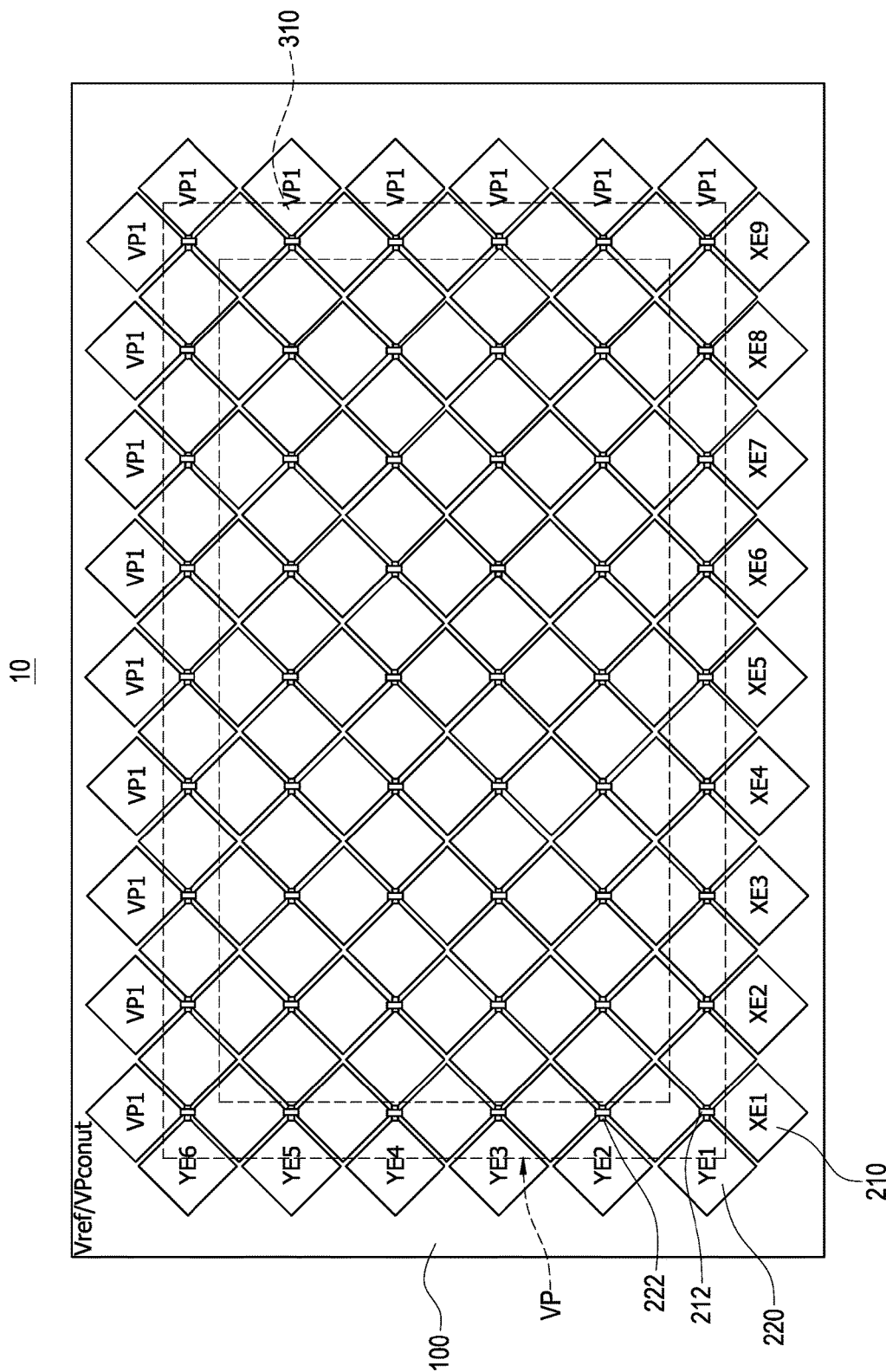
FIG. 11 is a top view of a signal of a touch and force sensing apparatus in force sensing according to an embodiment of the present invention.

Please refer to FIG. 9B, FIG. 9B is a diagram of a touch and force sensing apparatus 10 according to another embodiment of the present invention. The touch and force sensing apparatus 10 in FIG. 9B is similar to that shown in FIG. 7B. Refer also to FIG. 11, FIG. 11 is a top view of a signal of a touch and force sensing apparatus in force sensing according to an embodiment of the present invention, the touch and force sensing apparatus 10 in FIG. 11 is similar to that shown in FIG. 3 and mainly illustrates arrangement of the force capacitance-exciting signal Vp and interlayer capacitance eliminating signal Vp1 of the touch and force sensing apparatus 10 in force sensing operation. The self-capacitance sensing circuit 50' applies a force capacitance-exciting signal Vp to the force sensing electrode 310, and applies an interlayer capacitance eliminating signal Vp1 with phase same as that of the force capacitance-exciting signal Vp to the first touch electrodes 210 and the second touch electrodes 220, for shielding finger interference. The self-capacitance sensing circuit 50' sequentially or randomly applies the counter-exciting signal VPcount to the reference force electrode layer 600, or applies a reference voltage Vref to the reference force electrode layer 600. Refer also to FIG. 8A, FIG. 8A shows generation of the force capacitance-exciting signal Vp, interlayer capacitance eliminating signal Vp1 and counter-exciting signal VPcount in FIG. 9B and FIG. 11. The capacitance-excitation driving circuit 52' includes a signal source 520' and a driving unit 522', and generates the force capacitance-exciting signal Vp. In addition, the capacitance-excitation driving circuit 52' amplifies output of the signal source 520' with a non-inverting amplifier 56' (gain of the non-inverting amplifier 56' is preferred to be 1), to generate the interlayer capacitance eliminating signal Vp1. In addition, capacitance-excitation driving circuit 52' amplifies output of the signal source 520' with an inverting amplifier 59' (gain of the inverting amplifier 59' is preferred to be less than or equal to zero), to generate the counter-exciting signal VPcount. In the circuit shown in FIG. 8A, the input of the non-inverting amplifier 56' in the capacitance sensing module 50, used for generating the interlayer capacitance eliminating signal Vp1, is not connected to a sensing point P of the capacitance measuring circuit 54'. For example, the input of the non-inverting amplifier 56' is directly connected to the signal source 520', to avoid influence from the force sensing signal Vc at the sensing point P of the capacitance measuring circuit 54'.

Figure 9C:
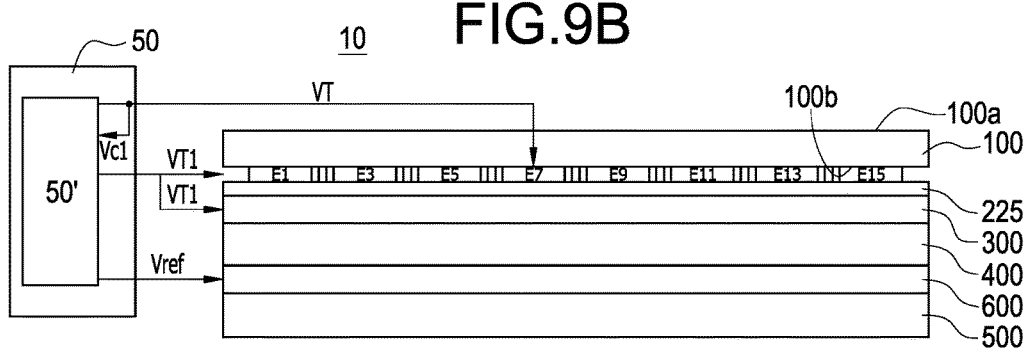
FIG. 9C is a diagram of a touch and force sensing apparatus according to another embodiment of the present invention.
Figure 9D:
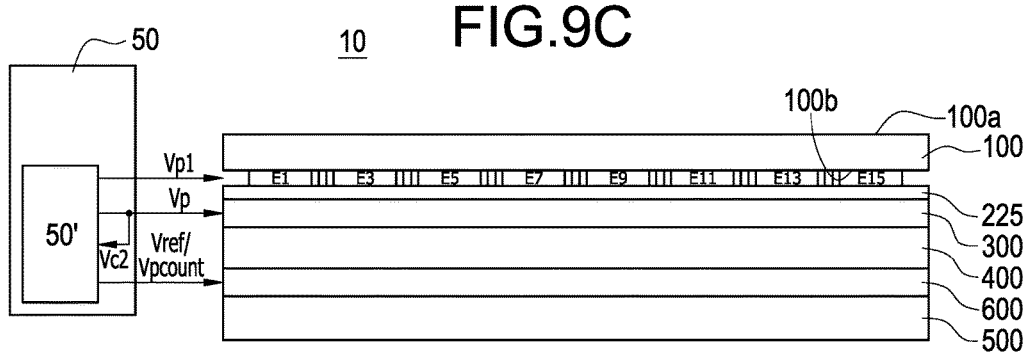
FIG. 9D is a diagram of a touch and force sensing apparatus according to another embodiment of the present invention.

Refer to FIG. 8A, and also to FIG. 9C and FIG. 9D. The circuit in FIG. 8A may also be used to generate signal of the touch and force sensing apparatus shown in FIG. 9C and FIG. 9D in touch or force sensing. In touch sensing, the capacitance-excitation driving circuit 52' sequentially or randomly applies a touch capacitance-exciting signal VT to a selected touch sensing electrode. The capacitance-excitation driving circuit 52' applies the touch capacitance-exciting signal VT to the non-inverting amplifier 56' to generate an auxiliary signal VT1 with phase same as that of the touch capacitance-exciting signal VT. The auxiliary signal VT1 is applied to at least one corresponding force sensing electrode 310.

Figure 12:
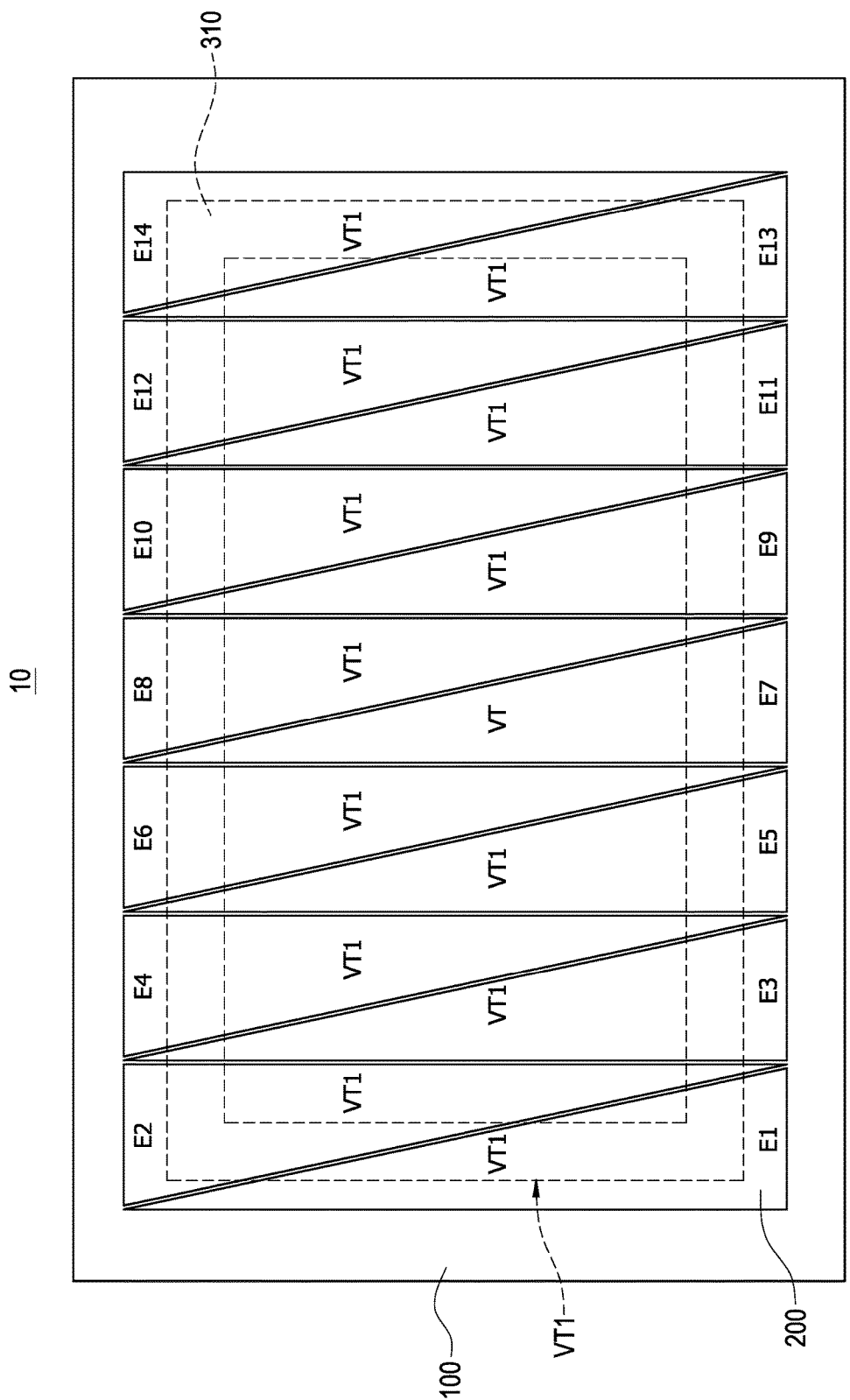
FIG. 12 is a top view of a signal of a touch and force sensing apparatus in touch sensing according to another embodiment of the present invention.

Refer also to FIG. 9C, FIG. 9C is a diagram of a touch and force sensing apparatus 10 according to another embodiment of the present invention, the touch sensing is implemented by self-capacitance sensing. Refer also to FIG. 12, FIG. 12 is a top view of a signal of a touch and force sensing apparatus in touch sensing according to another embodiment of the present invention, the touch and force sensing apparatus 10 in FIG. 12 is similar to that shown in FIG. 5 or 6, FIG. 12 mainly illustrates arrangement of the touch capacitance-exciting signal VT and auxiliary signal VT1 of the touch and force sensing apparatus 10 in touch sensing. When the touch and force sensing apparatus 10 sequentially or randomly applies a touch capacitance-exciting signal VT to a selected touch sensing electrode E7, the capacitance sensing module 50 also processes the touch capacitance-exciting signal VT to generate the auxiliary signal VT1 with phase same as that of the touch capacitance-exciting signal VT, the auxiliary signal VT1 is applied to at least one corresponding force sensing electrode 310 (on force electrode layer 300). The auxiliary signal with phase same as that of the touch capacitance-exciting signal VT is applied to at least one corresponding force sensing electrode 310, thus there is equivalently (almost) no voltage difference between the selected the touch sensing electrode E7 and at least one corresponding force sensing electrode. Then there is no capacitance generated or only minute capacitance generated (minute capacitance without influencing touch sensing). That is, while sensing of touch operation corresponding to the selected touch sensing electrode E7, capacitance interference generating from warping of the resilient dielectric layer 400 can be avoided, and influence resulting from parallel effect of capacitance between grounded point and force sensing electrode can also be avoided. Similarly, the auxiliary signal VT1 can also be applied to touch sensing electrodes around the selected touch sensing electrode E7, for eliminating stray capacitance effect between the selected touch sensing electrode E7 and the surrounding touch sensing electrodes such that voltage difference between the selected touch sensing electrode E7 and the surrounding touch sensing electrodes is zero. Moreover, electric flux will concentrate above the selected touch sensing electrodes, thus the sensitivity of proximity sensing is enhanced. In touch sensing, a reference voltage Vref (for example, when gain of the inverting amplifier 59' is zero, the reference voltage Vref is a zero voltage signal) can also be applied to the reference force electrode layer 600. After the capacitance-excitation driving circuit 52' of the capacitance sensing module 50 applies the touch capacitance-exciting signal VT to the selected touch sensing electrode, the capacitance measuring circuit 54' of the capacitance sensing module 50 can read the touch sensing signal Vc1 at the sensing point P. That is, touch position can be sensed accurately.

Figure 13:
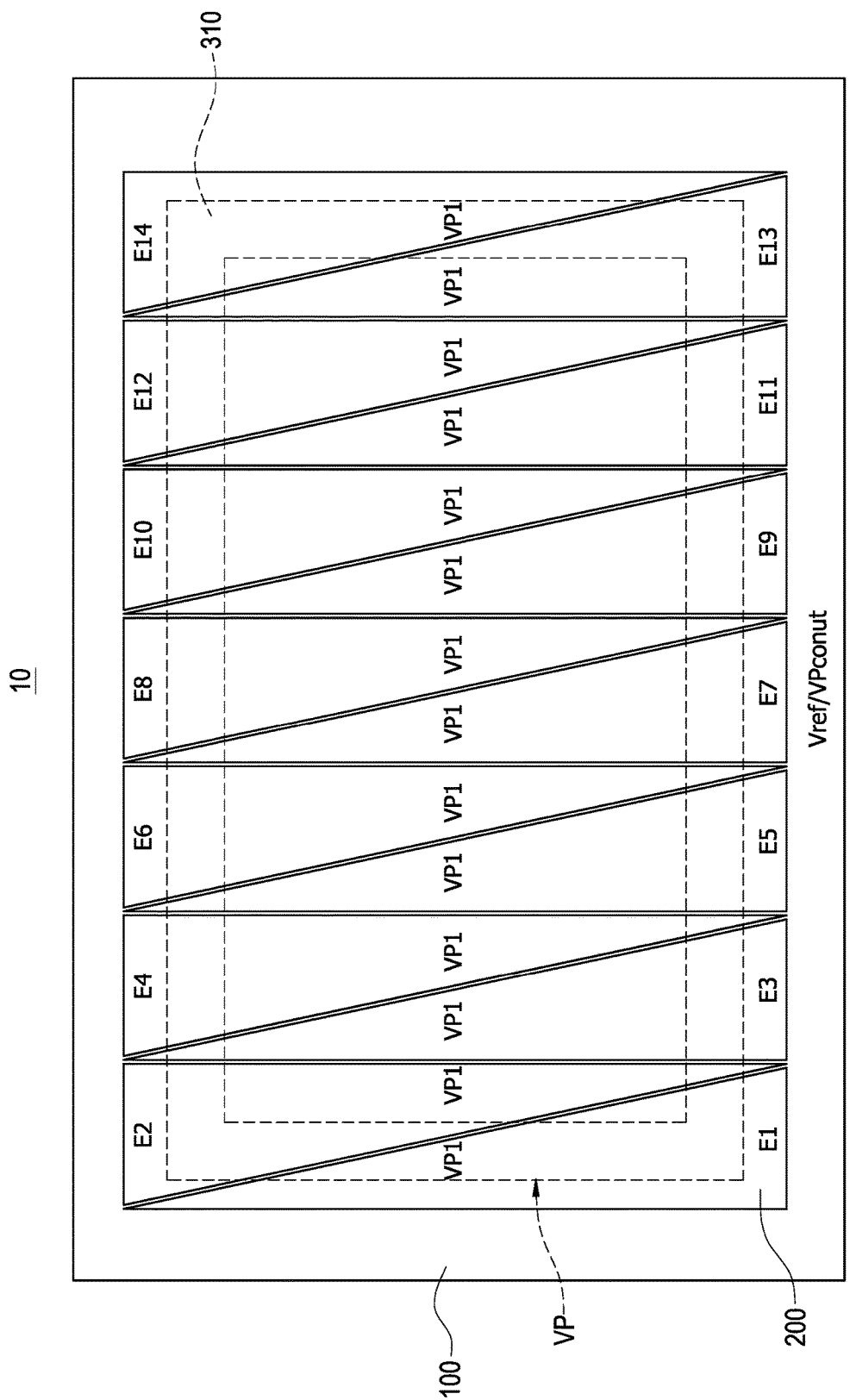
FIG. 13 is a top view of a signal of a touch and force sensing apparatus in force sensing according to another embodiment of the present invention.

Refer also to FIG. 9D, FIG. 9D is a diagram of a touch and force sensing apparatus 10 according to another embodiment of the present invention. Refer also to FIG. 13, FIG. 13 is a top view of a signal of a touch and force sensing apparatus 10 in force sensing according to another embodiment of the present invention, the touch and force sensing apparatus 10 in FIG. 13 is similar to FIG. 5, FIG. 13 mainly illustrates arrangement of the force capacitance-exciting signal Vp and interlayer capacitance eliminating signal Vp1 of the touch and force sensing apparatus 10 in force sensing. If the capacitance sensing module 50 applies a force capacitance-exciting signal Vp used for force sensing to a force sensing electrode 310 (on the force electrode layer 300), the capacitance sensing module 50 processes the force capacitance-exciting signal Vp to generate the interlayer capacitance eliminating signal Vp1 amplified in noninverting way, the interlayer capacitance eliminating signal Vp1 is applied to the touch electrodes. That is, the touch electrode layer 200 can be used as a shielding layer of the force electrode layer 300, for shielding capacitance change from finger operation, increasing accuracy in force sensing. Moreover, an alternating counter-exciting signal VPcount with same phase as that of force capacitance-exciting signal Vp is applied to the reference force electrode layer 600, for improving sensitivity of force sensing and accuracy of recognizing pressed point of the corresponding force sensing electrode, or a reference voltage Vref may be applied to the reference force electrode layer 600. The generation method of signals shown in FIG. 9D and FIG. 13 (force capacitance-exciting signal Vp, interlayer capacitance eliminating signal Vp1, counter-exciting signal VPcount) may also be referred in circuit shown in FIG. 8A. The input of the non-inverting amplifier 56' in the capacitance sensing module 50, used for generating the interlayer capacitance eliminating signal Vp1, is not connected to the sensing point P of the capacitance measuring circuit 54', For example, the input of the non-inverting amplifier 56' is directly connected to the signal source 520', to avoid influence from the force sensing signal Vc2 of the sensing point P of the capacitance measuring circuit 54'.

FIG. 8B is a diagram of signal in touch sensing or force sensing of a touch and force sensing apparatus according to another embodiment of the present invention, the architecture in FIG. 8B is similar to that shown in FIG. 8A, but this embodiment uses DC reference voltage source 53' to generate the reference voltage Vref (for example, a grounded signal with a zero voltage) shown in FIG. 9C or FIG. 9D.

Figure 14:
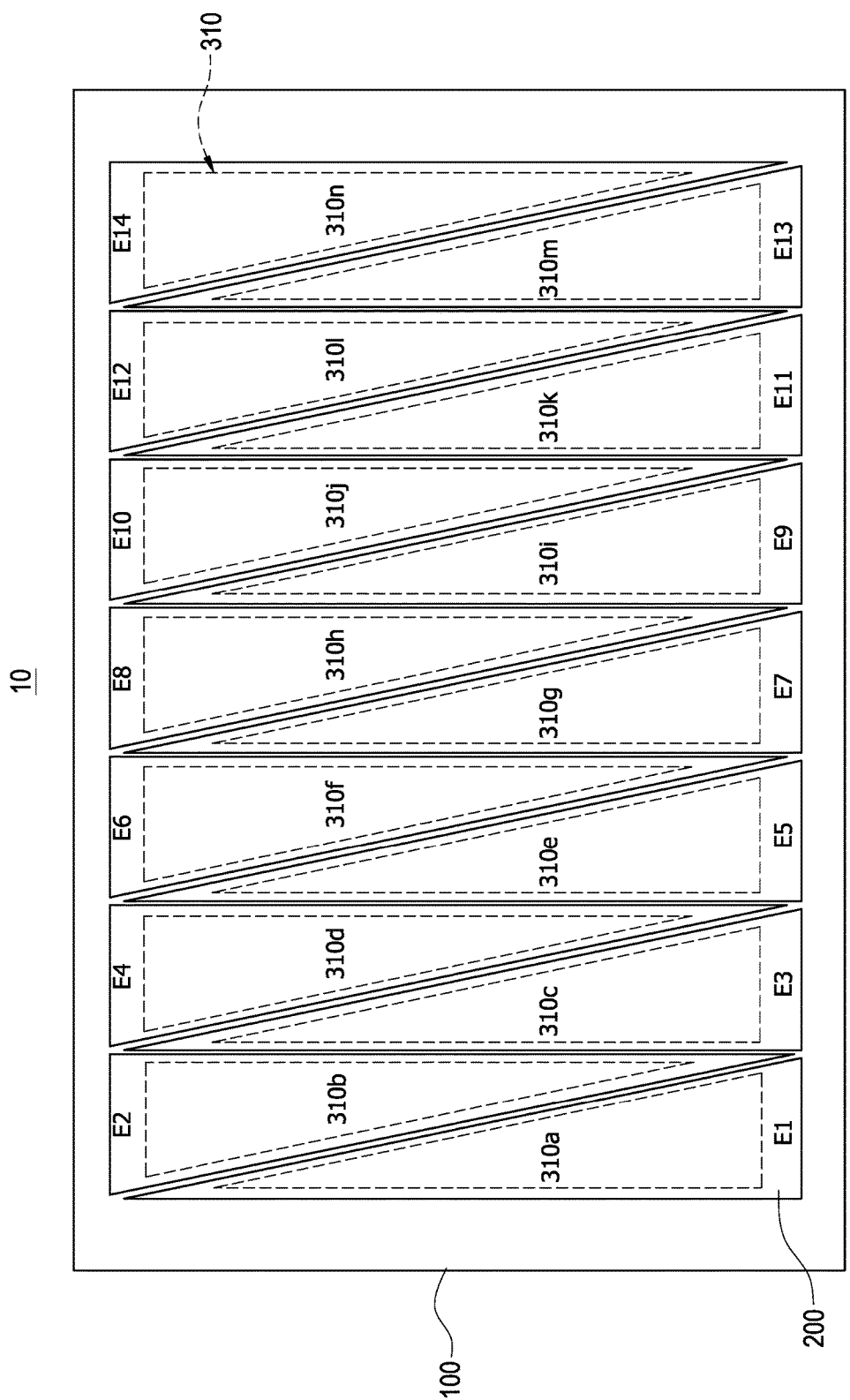
FIG. 14 is a diagram of a touch and force sensing apparatus according to another embodiment of the present invention.

Please refer to FIG. 14, FIG. 14 is a diagram of a touch and force sensing apparatus 10 according to another embodiment of the present invention, the touch and force sensing apparatus 10 in FIG. 14 is similar to that shown in FIG. 5, FIG. 14 mainly illustrates arrangement of the protection layer 100, the touch sensing electrodes E1-E14, the force sensing electrode 310 in top view. However, in the embodiment, the force electrode layer 300 includes a plurality of force sensing electrodes 310 (such as the force sensing electrodes 310a-310n shown in the diagram). Each force sensing electrode 310 corresponds to one touch sensing electrode, and each touch sensing electrode is larger than a corresponding force sensing electrode 310 such that each touch sensing electrode provides good shielding to each corresponding force sensing electrode 310, it needs to be known that size of the force sensing electrodes is not limited in the diagram.

Figure 15:
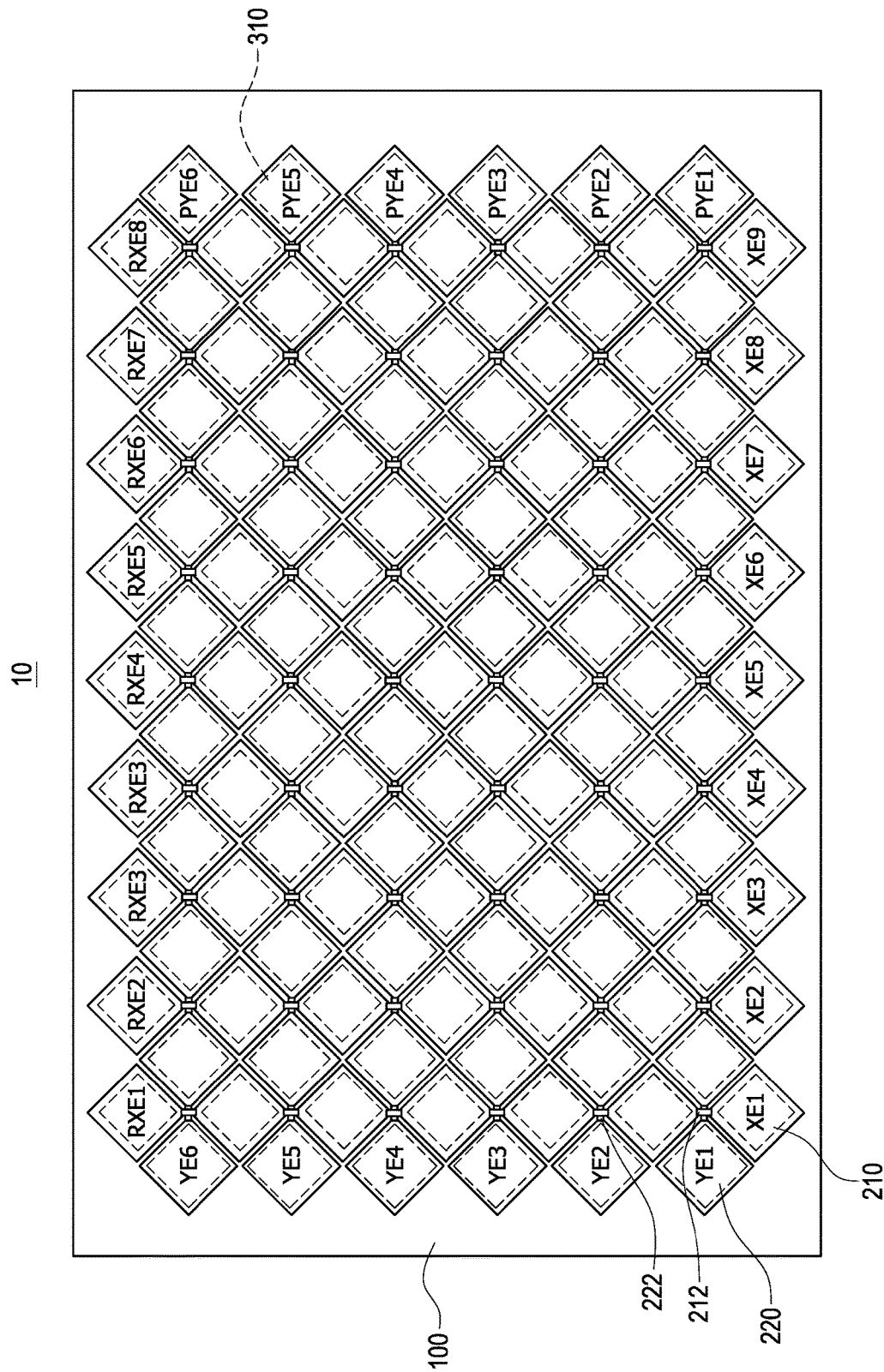
FIG. 15 is a diagram of a touch and force sensing apparatus according to another embodiment of the present invention.

Please refer to FIG. 15, FIG. 15 is a diagram of a touch and force sensing apparatus 10 according to another embodiment of the present invention, the touch and force sensing apparatus 10 in FIG. 15 is similar to that shown in FIG. 1. However, in the embodiment, the force electrode layer 300 includes a plurality of force sensing electrode 310. Each first touch electrode 210 corresponds to each force sensing electrode 310, and each first touch electrode 210 is larger than each corresponding force sensing electrode 310 such that each first touch electrode 210 provides good shielding to each corresponding force sensing electrode 310, it needs to be known that size of the force sensing electrodes is not limited in the diagram.

Especially, in each embodiment mentioned above, each two adjacent first touch electrodes (or two adjacent touch sensing electrodes) need to be close to each other as possible such that the first touch electrodes provide good shielding for the force sensing electrode 310 in force sensing operation, and prevent interference from external finger (or charged body) from influencing force sensing electrodes in force sensing.

Moreover, in each embodiment mentioned above, the protection layer 100 is a glass substrate, a polymer thin film substrate, or a cured coating layer. The protection layer 100 is used for protecting transparent touch electrode layer from damage by scratching, touching or moisture. The touch capacitance-exciting signal or the force capacitance-exciting signal is an alternating signal, such as sinusoid, triangular, or trapezoidal wave signal, also may be a current source. The counter-exciting signal is a DC reference voltage (for example, zero voltage signal) or an alternating signal with phase opposite to that of the force capacitance-exciting signal. The resilient dielectric layer 400 includes a resilient gelatinous material, the resilient gelatinous material is compressively deformed under pressure, and restores to original shape and volume if pressure is not present. The resilient dielectric layer 400, for example, may be, but not limited to polydimethylsiloxane (PDMS) or an optical clear adhesive (OCA). The substrate 500 may be a glass substrate or a polymer substrate, or a color filter substrate of display. The reference force electrode layer 600 may be a static shielding protection layer of a display panel or a polarizer layer of a display panel, the polarizer layer is made of conductive material. The interlayer capacitance eliminating signal is a signal with same phase and voltage as that of the force capacitance-exciting signal.

Figure 16:
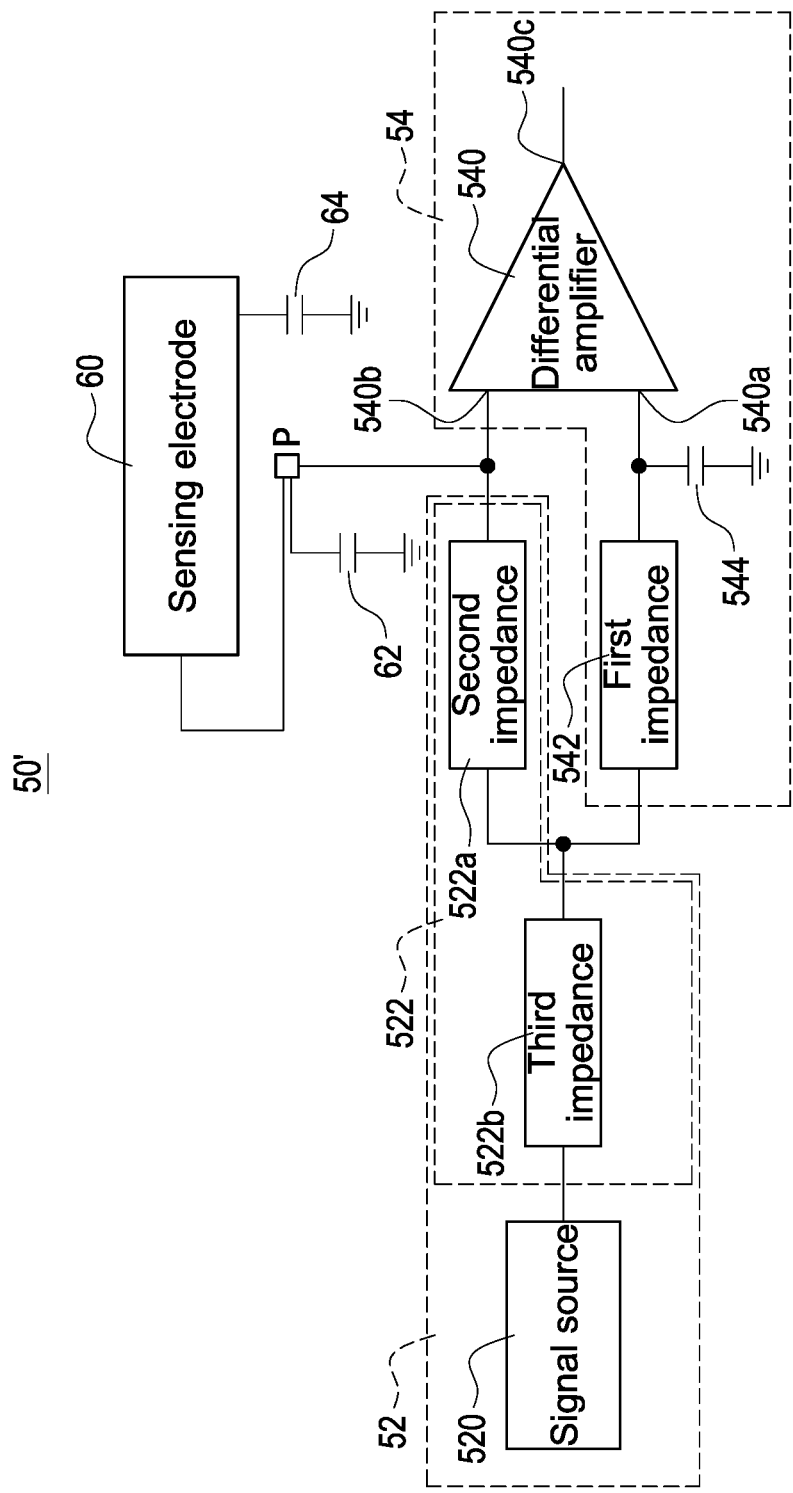
FIG. 16 is a circuit diagram of the self-capacitance sensing circuit according to an embodiment of the present invention.

FIG. 16 shows the circuit diagram of the self-capacitance sensing circuit 50' according to an embodiment of the present invention. The self-capacitance sensing circuit 50' mainly comprises a capacitance-excitation driving circuit 52 and a capacitance measuring circuit 54 to sense a capacitance change at the sensing point P. The capacitance-excitation driving circuit 52 comprises a signal source 520 and a driving unit 522 (including a second impedance 522a and a third impedance 522b). The capacitance measuring circuit 54 comprises a differential amplifier 540, a first impedance 542 and a first capacitor 544 and is used to sense a capacitance change at a sensing electrode 60, where the sensing electrode 60 comprises a first stray capacitance 62 and a second stray capacitance 64. The signal source 520 is electrically coupled with the first impedance 542 and the second impedance 522a. The first impedance 542 is electrically coupled with the first capacitor 544 and the first capacitor 544 is electrically coupled with the first input end 540a of the differential amplifier 540. The second impedance 522a is electrically coupled with the second input end 540b of the differential amplifier 540. The sensing electrode 60 is electrically coupled to the second impedance 522a and the second input end 540b through a node (such as an IC pin) of the self-capacitance sensing circuit 50'. The first stray capacitance 62 is electrically coupled to the node and the second stray capacitance 64 is electrically coupled to the sensing electrode 60.

In the self-capacitance sensing circuit 50' shown in FIG. 16, the sensing electrode 60 receives a touch signal when a finger or a conductor is touched thereon. The signal source 520 is a periodical signal and sent to the third impedance 522, while the resistance values of the first impedance 542 and the second impedance 522a are identical. The differential amplifier 540 will generate a differential touch signal after receiving the signal source 520 and the touch signal from the sensing electrode 60. In this embodiment, the capacitance of the first capacitor 544 is equal to the resulting capacitance of the first stray capacitance 62 in parallel connection with the second stray capacitance 64. The capacitance of the second stray capacitance 64 changes when user finger approaches or touches the sensing electrode 60. Therefore, the voltages fed to the first input end 540a and the second input end 540b will be different such that the differential amplifier 540 has a (non-zero) differential output at the output end 540c. In this way, the minute capacitance change on the sensing electrode 60 can be detected by the differential amplifier 540. Moreover, the noise from circuits or power source can be advantageously removed. The detail of the self-capacitance sensing circuit 50' can be referred to U.S. Pat. No. 8,704,539 (corresponding to Taiwan patent No. 1473001) filed by the same applicant.

The touch and force sensing apparatus of the present invention, integrates touch sensing and force sensing into an apparatus with simple structure, to decrease cost and increase convenience for use.

Thus, particular embodiments have been described. Other embodiments are within the scope of the following claims. For example, the actions recited in the claims may be performed in a different order and still achieve desirable results.

What is claimed is:

1. A touch and force sensing apparatus comprising:
a touch electrode layer comprising a plurality of first touch electrodes arranged along a first direction and a plurality of second touch electrodes arranged along second direction, wherein the first direction is substantially perpendicular to the second direction;
a protection layer arranged on a side of the touch electrode layer;
a force electrode layer arranged on a side of the touch electrode layer, the side being opposite to the protection layer, the force electrode layer comprising at least one force sensing electrode;
a resilient dielectric layer, arranged on a side of the force electrode layer, the side being opposite to the touch electrode layer; and
a capacitance sensing module sequentially or randomly applying a touch driving signal to selected ones of the second touch electrodes, and sequentially or randomly receiving a touch sensing signal from selected ones of the first touch electrodes in a touch sensing operation; the capacitance sensing module sequentially or randomly applying a force capacitance-exciting signal to the at least one force sensing electrode, and receiving a force sensing signal from the force sensing electrode in a force sensing operation;
wherein the touch driving signal is applied to the selected ones of the second touch electrodes at a first time, the touch sensing signal is received from selected ones of the first touch electrodes at the first time, the force capacitance-exciting signal is applied to the at least one force sensing electrode at the second time, the first time is different with the second time; and
wherein the capacitance sensing module applies an interlayer capacitance eliminating signal, with phase same as that of the force capacitance-exciting signal, to the first touch electrodes and the second touch electrodes in force sensing operation, wherein the interlayer capacitance eliminating signal is different with the touch driving signal and the force capacitance-exciting signal.

2. The touch and force sensing apparatus of claim 1, wherein the protection layer is a glass substrate, a polymer thin film substrate, or a cured coating layer.

3. The touch and force sensing apparatus of claim 1, wherein the capacitance sensing module applies a reference voltage to the at least one force sensing electrode in the touch sensing operation.

4. The touch and force sensing apparatus of claim 1, wherein the capacitance sensing module comprises a mutual-capacitance sensing circuit and a self-capacitance sensing circuit, the capacitance sensing module senses a position of a touch point with the mutual-capacitance sensing circuit in the touch sensing operation, and senses a self-capacitance change of the force sensing electrode with the self-capacitance sensing circuit in the force sensing operation.

5. The touch and force sensing apparatus of claim 1, wherein the resilient dielectric layer includes a resilient gelatinous material, the resilient gelatinous material is compressively deformed under pressure, and restores to original shape and volume if pressure is not present.

6. The touch and force sensing apparatus of claim 1, wherein the force capacitance-exciting signal is an alternating signal or a current source.

7. The touch and force sensing apparatus of claim 1, further comprising a reference force electrode layer arranged on a side of the resilient dielectric layer, the side being opposite to the force electrode layer, the reference force electrode layer comprising at least one reference force electrode.

8. The touch and force sensing apparatus of claim 7, wherein the capacitance sensing module further applies a counter-exciting signal to the reference force electrode layer in the force sensing operation.

9. The touch and force sensing apparatus of claim 8, wherein the counter-exciting signal is an alternating signal with phase opposite to that of the force capacitance-exciting signal.

10. The touch and force sensing apparatus of claim 7, wherein the capacitance sensing module further applies a reference voltage to the reference force electrode layer in the force sensing operation.

11. The touch and force sensing apparatus of claim 10, wherein the reference voltage is a zero voltage signal.

12. The touch and force sensing apparatus of claim 7, wherein the reference force electrode layer is a static shielding protection layer of a display panel.

13. The touch and force sensing apparatus of claim 7, wherein the reference force electrode layer is a polarizer layer of a display panel, the polarizer layer is made of conductive material.

14. A touch and force sensing apparatus comprising:
a touch electrode layer comprising a plurality of touch sensing electrodes;
a protection layer arranged on a side of the touch electrode layer;
a force electrode layer arranged on a side of the touch electrode layer, the side being opposite to the protection layer, the force electrode layer comprising at least one force sensing electrode;
a resilient dielectric layer, arranged on a side of the force electrode layer, the side being opposite to the touch electrode layer; and
a capacitance sensing module sequentially or randomly applying a touch capacitance-exciting signal to the at least one touch sensing electrode, and sequentially or randomly receiving a touch sensing signal from the touch sensing electrode for touch sensing; the capacitance sensing module applying a force capacitance-exciting signal to the at least one force sensing electrode, and receiving a force sensing signal from the force sensing electrode for force sensing;
wherein the capacitance sensing module applies an interlayer capacitance eliminating signal, with phase same as that of the force capacitance-exciting signal, to the touch sensing electrodes in force sensing operation, wherein the interlayer capacitance eliminating signal is different with the touch driving signal and the force capacitance-exciting signal.

15. The touch and force sensing apparatus of claim 14, wherein the protection layer is a glass substrate, a polymer thin film substrate, or a cured coating layer.

16. The touch and force sensing apparatus of claim 14, wherein the interlayer capacitance eliminating signal is a signal with same phase and same voltage as that of the force capacitance-exciting signal.

17. The touch and force sensing apparatus of claim 14, wherein the capacitance sensing module applies an auxiliary signal with phase same as that of the touch capacitance-exciting signal to the at least one force sensing electrode in the touch sensing operation.

18. The touch and force sensing apparatus of claim 14, wherein the capacitance sensing module comprises at least one self-capacitance sensing circuit.

19. The touch and force sensing apparatus of claim 14, wherein the touch capacitance-exciting signal and the force capacitance-exciting signal are respectively an alternating signal or a current source.

20. The touch and force sensing apparatus of claim 14, further comprising a reference force electrode layer arranged on a side of the resilient dielectric layer, the side being opposite to the force electrode layer, and the reference force electrode layer comprising at least one reference force electrode.

21. The touch and force sensing apparatus of claim 20, wherein the capacitance sensing module further applies a reference voltage or a counter-exciting signal with phase opposite to that of the force capacitance-exciting signal to the reference force electrode layer in the force sensing operation.

22. The touch and force sensing apparatus of claim 20, wherein the reference force electrode layer is a static shielding protection layer of a display panel.

23. The touch and force sensing apparatus of claim 20, wherein the reference force electrode layer is a polarizer layer of a display panel, the polarizer layer is made of conductive material.

* * * * *